(12) United States Patent  (10) Patent No.: US 7,873,040 B2
Karlsgodt  (45) Date of Patent: Jan. 18, 2011

(54) INTERNET RADIO PLAYER

(75) Inventor: Stephen Karlsgodt, 2819 E. 19th St., Signal Hill, CA (US) 90755

(73) Assignee: Stephen Karlsgodt, Signal Hill, CA (US)

( * ) Notice: Subject to any disclaimer, the term of this patent is extended or adjusted under 35 U.S.C. 154(b) by 528 days.

(21) Appl. No.: 11/841,496

(22) Filed: Aug. 20, 2007

(65) Prior Publication Data

US 2009/0055195 A1   Feb. 26, 2009

(51) Int. Cl.
*H04L 12/28* (2006.01)
*H04B 1/18* (2006.01)
*H04M 3/00* (2006.01)
*G06F 15/16* (2006.01)
*G06F 3/00* (2006.01)

(52) U.S. Cl. ................... 370/389; 455/418; 455/185.1; 709/231; 715/716

(58) Field of Classification Search ................ None
See application file for complete search history.

(56) References Cited

U.S. PATENT DOCUMENTS

| | | | |
|---|---|---|---|
| 5,742,893 A | 4/1998 | Frank | |
| 5,900,564 A * | 5/1999 | Kurakake | 84/477 R |
| 6,061,306 A | 5/2000 | Buchheim | |
| 6,192,340 B1 | 2/2001 | Abecassis | |
| 6,389,463 B2 * | 5/2002 | Bolas et al. | 709/219 |
| 6,490,725 B2 * | 12/2002 | Kikinis | 725/87 |
| 6,658,091 B1 * | 12/2003 | Naidoo et al. | 379/37 |
| 6,993,004 B2 * | 1/2006 | Boys | 370/338 |
| 7,065,342 B1 | 6/2006 | Rolf | |
| 7,143,432 B1 * | 11/2006 | Brooks et al. | 725/105 |
| 2002/0120752 A1 * | 8/2002 | Logan et al. | 709/228 |
| 2003/0153336 A1 * | 8/2003 | Williams | 455/514 |
| 2003/0187654 A1 | 10/2003 | Hoshino | |
| 2004/0068536 A1 | 4/2004 | Demers et al. | |
| 2004/0093394 A1 * | 5/2004 | Weber et al. | 709/219 |
| 2004/0171377 A1 * | 9/2004 | Engstrom | 455/419 |
| 2004/0237750 A1 | 12/2004 | Smith et al. | |
| 2004/0252604 A1 | 12/2004 | Johnson et al. | |
| 2005/0125087 A1 | 6/2005 | Ben-Yaacov et al. | |
| 2005/0165942 A1 * | 7/2005 | McDowall et al. | 709/231 |
| 2006/0114890 A1 * | 6/2006 | Martin Boys | 370/352 |
| 2006/0155545 A1 | 7/2006 | Jayne | |
| 2006/0171395 A1 * | 8/2006 | Deshpande | 370/393 |

(Continued)

*Primary Examiner*—Pankaj Kumar
*Assistant Examiner*—Hicham B. Foud
(74) *Attorney, Agent, or Firm*—Sheppard Mullin Ritcher & Hampton LLP; David E. Heisey

(57) ABSTRACT

The present invention provides an apparatus for listening to music on the internet. The apparatus includes a memory unit configured to store a plurality of internet protocol addresses of internet radio stations, a communication unit configured to communicate with one of the internet radio stations using a corresponding IP address stored in the memory, a first logic configured to request a data from one of the internet radio stations, a second logic configured to receive a digital data stream from the internet station and store the received digital data stream in a buffer, a third logic configured to decode the received digital data stream, a fourth logic configured to convert the decoded digital data stream into an analog data stream, and a service module configured to extract information regarding a song from the digital data stream and forward the extracted information to an external device.

20 Claims, 3 Drawing Sheets

U.S. PATENT DOCUMENTS

| | | | |
|---|---|---|---|
| 2006/0206582 A1* | 9/2006 | Finn | 709/217 |
| 2006/0218613 A1* | 9/2006 | Bushnell | 725/109 |
| 2006/0224688 A1* | 10/2006 | Morris | 709/217 |
| 2007/0019819 A1 | 1/2007 | Garcia | |
| 2007/0064954 A1 | 3/2007 | Booth et al. | |
| 2007/0082701 A1 | 4/2007 | Seil et al. | |
| 2007/0153740 A1* | 7/2007 | Chang et al. | 370/331 |
| 2008/0025413 A1* | 1/2008 | Apostolopoulos | 375/240.26 |
| 2008/0048861 A1* | 2/2008 | Naidoo et al. | 340/541 |
| 2008/0133371 A1* | 6/2008 | Chumbley et al. | 705/14 |
| 2009/0077203 A1* | 3/2009 | Janik | 709/219 |
| 2010/0023860 A1* | 1/2010 | Toro-Lisoni | 715/716 |

* cited by examiner

INTERNET RADIO PLAYER

TECHNICAL FIELD

The present invention relates generally to audio players, and more particularly, to a portable internet radio.

DESCRIPTION OF THE RELATED ART

People have been listen to music, sport broadcasts, news, and other audio programming over FM (frequency modulation) and AM (amplitude modulation) radio for many generations. The radio is one of the most ubiquitous consumer items. It can be found in cars, boats, offices, and practically in any room of a house. One of the reasons why the radio is so ubiquitous is the availability of free audio contents. Prior to the advent of XM radio and Sirius, practically all of the audio contents on the radio were advertisement supported. Additionally, FM and AM radio receivers have been made smaller and portable, which greatly helped the popularity and use of the radio.

Today, FM/AM radio is replete with advertisement. One study suggested that there are between 40-50 minutes of advertisement per hour of FM/AM radio. As a result, people are seeking alternatives to the traditional radio such as, for example, subscription radio (e.g., XM, Sirius) and internet radio. Internet radio offers many advantages over the traditional FM/AM radio. One of the advantages is that there is practically no geographic boundary in internet radio. A listener residing in Oakland, Calif., for example, may tune into an internet radio program being broadcast in Paris, France. This would, of course, be almost impossible to do with a traditional FM/AM radio receiver. Another advantage of internet radio is the amount of available radio stations. There are thousands, if not tens of thousands, of internet radio stations around the world.

There are, however, several drawbacks to internet radio. One drawback is that a user must have access to the internet and be constantly hooked on with an internet provider. Furthermore, to listen to internet radio, the user will likely need a computer, speakers, and proper software. Additionally, although internet radio programs are abundant, it is not as simple as turning a knob to find the desired internet radio stations and contents. Another drawback is the lack of portability and mobility of internet radio. To listen to internet radio, one must stay within range of a computer.

BRIEF SUMMARY OF EMBODIMENTS OF THE INVENTION

The present invention is directed to systems for listening to music on a portable internet radio player. The system may comprise: a memory unit configured to store a plurality of internet protocol addresses of internet radio stations; a communication unit configured to communicate with one of the internet radio station using a corresponding IP address stored in the memory; a first logic configured to request data from one of the internet radio stations; a second logic configured to receive a digital data stream from one of the plurality of internet stations and store the received digital data stream in a buffer; a third logic configured to decode the received digital data stream; a fourth logic configured to convert the decoded digital data stream into an analog data stream; and a service module configured to extract text information regarding a song from the digital data stream and forward the extracted information to an external device.

In one embodiment, the system includes a web module coupled to the communication unit, the web module is configured to accept HTTP requests from a remote client. The web module is configured to allow operational settings of the device to be changed via the remote client. Such operational settings may include, but are not limited to, power, volume, and station selection.

In a further embodiment, the service module is configured to forward the extracted text information in response to a user request. The extracted information may be forwarded using email or using text messaging. The extracted information may comprise the name of the song, artist, label, and the duration of the song.

In yet another embodiment, the specified bit rate is the minimum bit rate the data stream is required to have. Alternatively, the specified bit rate is the maximum bit rate the data stream may have.

In a further embodiment, the specified bit rate is a range of bit rates the data stream is required to have.

In yet another embodiment, the ASIC includes a fifth logic configured to store the received data stream in a second memory unit.

In a further embodiment, the user interface is configured to allow a user to tune to a different internet radio station.

In yet another embodiment, the first logic is configured to request data streams from a plurality of internet radio stations with the IP addresses stored in the memory unit.

In a further embodiment, the communication unit is a wireless communication unit such as 802.11 or WiMax.

In a further embodiment, the system includes a client module configured to request information on available internet radio stations from a remote server, wherein the requested information includes names and IP addresses of available internet radio stations, genres, playtimes, title, artist, etc.

In another embodiment, an internet radio tuner comprises: a communication unit configured to communicate with an internet radio station; an application specific integrated circuit (ASIC) comprising: a first logic configured to request a data stream from the internet radio station; a second logic configured to receive a digital data stream from one of the plurality of internet stations and store the received digital data stream in a buffer; a third logic configured to decode the received digital data stream; a fourth logic configured to convert the decoded digital data stream into an analog data stream; and a web module coupled to the communication unit, the web module configured to accept HTTP requests from a remote client.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

1. Overview

Figure 1:
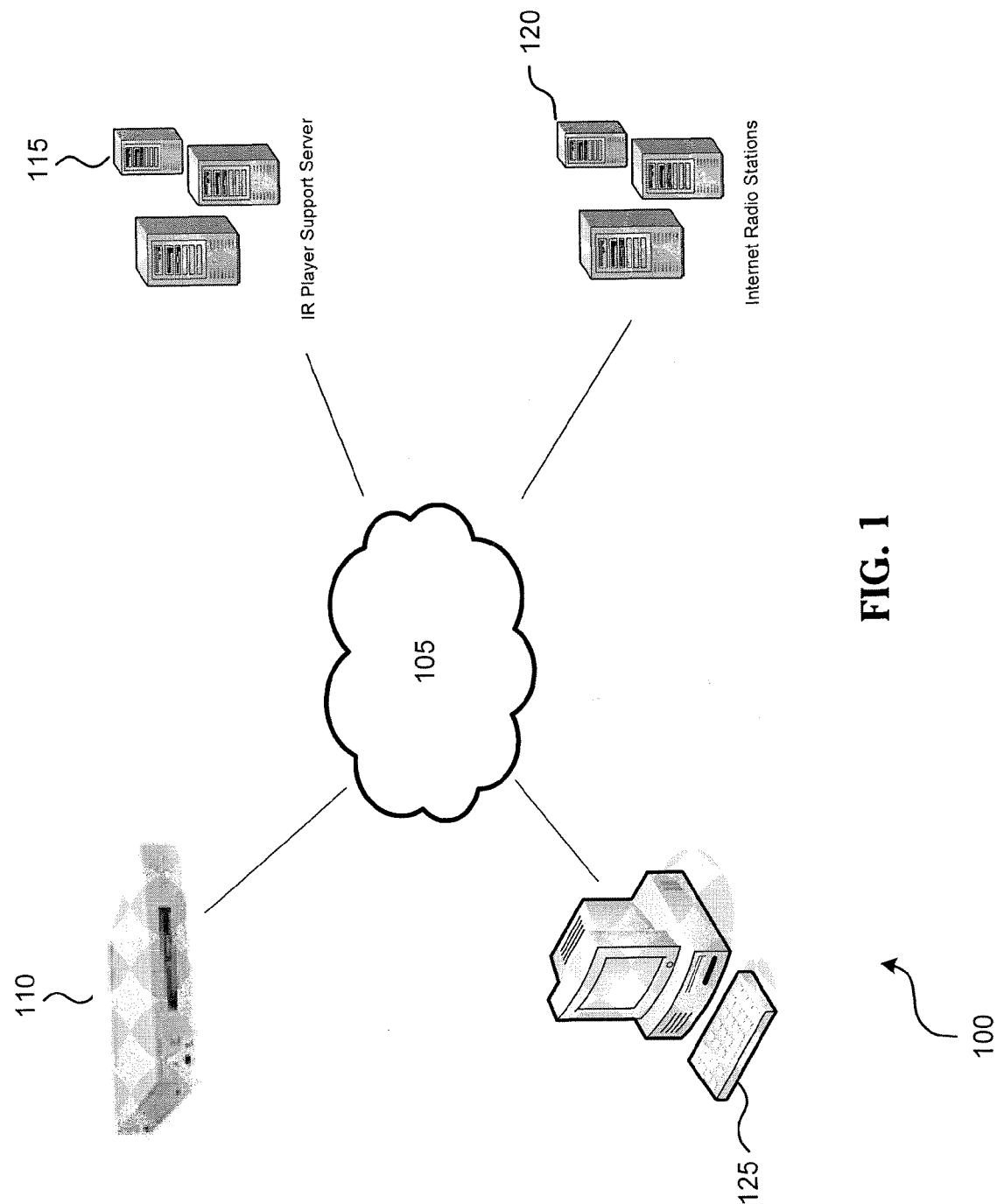
FIG. 1 illustrates an exemplary environment in which an internet radio player can be implemented according to an embodiment of the present invention.

Before describing the invention in detail, it is useful to describe an example environment in which the invention may be implemented. FIG. 1 illustrates such an environment 100 in which the present invention may be implemented. Environment 100 includes a network 105, an internet radio player 110, an internet radio support server 115, a plurality of internet radio stations 120, and a computer 125. Network 105 can be the internet, a local area network (LAN), a wide area network (WAN), a plain old telephone system (POTS), or any other suitable network.

Internet radio player 110 is a portable device and may communicate with network 105 using a hardwire connection such as an RJ45 Ethernet port. Alternatively, internet radio player 110 may communicate with network 105 using a wireless communication standard such as, but not limited to, 802.11b (wireless fidelity or Wi-Fi), WiMAX, HomeRF, or other suitable wireless communication standard. Internet radio player 110 may come pre-programmed with internet addresses of available internet radio stations 120. At predetermined times, internet radio player 110 may communicate with internet radio player support server 115 to acquire updated information regarding internet radio stations 120 and their programming. Alternatively, internet radio 110 may regularly receive information from internet radio player support server 115 to constantly receive real time information regarding available programming on various internet radio stations.

In an embodiment, internet radio player support server 115 keeps an updated database on available radio stations on the internet. Support server 115 also records information regarding the audio programs and content of an internet radio station where available. For example, an internet radio station may have a scheduled programming such as news or documentary every Friday at 3 P.M. Support server 115 may also obtain information such as name of the audio program, name of the artist or author, name of label, etc. These types of information may be recorded by support server 115. In an embodiment, support server 115 periodically sends some or all of the recorded information to internet radio player 110.

Internet radio player 110 may store the information received from support server 115 into its memory unit. In this way, internet radio player 110 may independently operate without continuous support from support server 115. Internet radio player 110 includes a graphic user interface (GUI) that allows the user to set various operational settings of the player. For example, using the GUI, the user may turn the power on or off, adjust the volume, change station, save a station to a memory, and get information of a song that is currently being streamed, etc.

Additionally, internet radio player includes an HTTP (hypertext transfer protocol) server module to allow users to have access the radio player from a remote location using a web browser. With the server module, a user is able to use computer 125 to browse the web-based menus of internet radio player 110 and change the operational settings of internet radio player 110 via a web-based interface. This feature gives internet radio player 110 additional flexibility and portability.

Although not shown, internet radio player 110 may be connected to external receivers, speakers, or other sound systems. In an embodiment, internet radio player 110 also has built-in speakers and audio output for headphones.

2. Internet Radio Player

The way we listen to and store music has dramatically changed over the last decade. Today, music or audio data are stored in many forms of media such as CDs, magnetic hard drives, and flash memories. This is predominantly made possible with the availability of various compression technologies such as WMA (Windows Media Audio), AAC (Advanced Audio Coding), and MP3 (MPEG Audio Layer 3). The ease of audio storage has also made delivering audio content easier and more flexible. More than ever, audio content is being delivered via the internet. At any point of time, there are thousands of active internet radio stations around the world. Most of those stations deliver quality and free audio contents. However, unlike normal FM/AM radio receivers, to receive live streaming audio from an internet radio station, one must be near a computer. Internet radio player 110 provides many added features not found in traditional FM/AM radio receivers and traditional internet radio players including without limitation, freedom of movement, content control, and remote operation.

Figure 2:
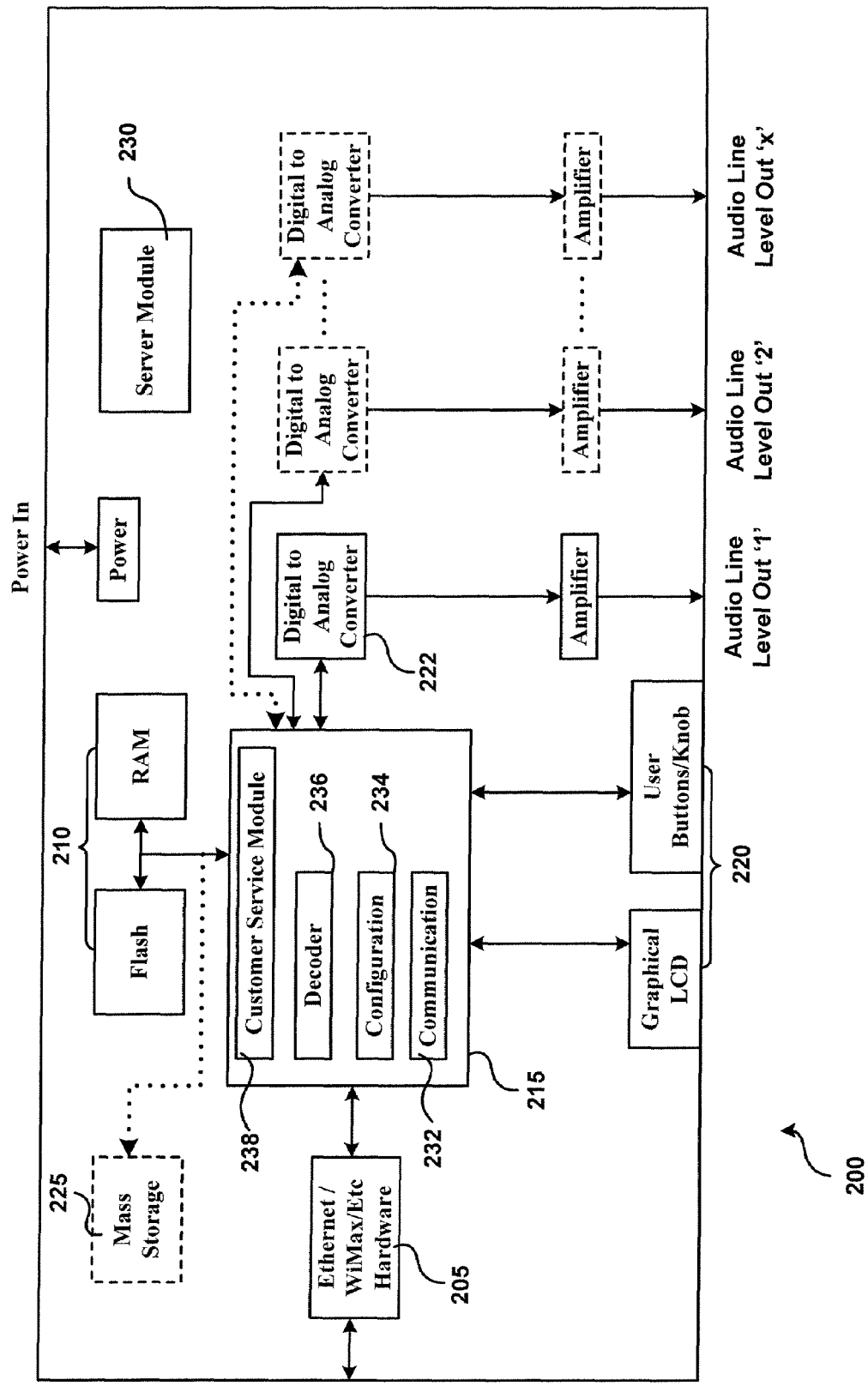
FIG. 2 illustrates a block diagram of an internet radio player according to an embodiment of the present invention.

FIG. 2 illustrates an internet radio player 200 according to an embodiment of the present invention. Internet radio player 200 can be implemented in environment 100 in place of internet radio player 110 (FIG. 1). As illustrated in FIG. 2, internet radio player 200 includes communication hardware 205, a memory unit 210, an application specific integrated circuit (ASIC) 215, user interface 220, a storage device 225, and a web server module 230.

Communication hardware 205 may include an interface for communicating with the Ethernet such as an RJ-45 communication port. Communication hardware 205 is also configured to communicate with wireless network using Wi-Fi, WiMAX, or other suitable wireless communication protocol. Using communication hardware 205, internet radio player 200 may communicate with the support server 115 and internet radio station 120 of FIG. 1. As mentioned, support server 115 provides a periodic or a constant update on available internet radio stations and their programming to internet radio player 200. It may also provide an update of information as a result of a direct query from the unit. For example, support server 115 may send updated information that includes names, IP addresses, programming schedules, data streaming or compression format, information regarding songs to be broadcasted, songs previously broadcasted, and bit rates of available internet radio stations. Internet radio player 200 may store the updated information in memory unit 210.

In one embodiment, memory unit 210 comprises a flash memory (e.g., electrically erasable programmable read-only memory) and a random access memory (RAM). Alternatively, memory unit 210 may be a read only memory (ROM), magnetoresistive random access memory (MRAM), or other suitable types of memory.

ASIC 215 comprises multiple integrated circuit components configured to perform various functions such as, but not limited to, communication, data management, data decoding, customer servicing, and signal conversion. The functional boundary of ASIC 215 is flexible. For example, one or more components of ASIC 215 may be parsed into separate ASIC components or modules. Alternatively, one or more modules of ASIC 215 may be combined into a single ASIC module. In the illustrated embodiment, communication unit 205 and/or a digital analog converter 222 may be part of ASIC 215 rather than being separate units.

In one embodiment, ASIC 215 includes a communication module 232 configured to establish communication with external devices such as server 115 and/or radio station 120 using communication unit/hardware 205. In one embodiment, communication hardware 205 and logic 232 are one component. Communication module 232 provides an interface for information transfer between communication hardware 205 and ASIC 215. In one embodiment, communication module 232 forwards the IP address of support server 115 or one of the internet radio stations 120 to communication hardware 205 from memory 210. Once ASIC 215 established communication with radio station 120, a request for a digital audio data stream is sent out. ASIC 215 is also configured to receive the digital audio data stream from one of the plurality of internet stations and store the received digital data stream in a buffer, memory 210, or storage device 225 for later retrieval. In an embodiment, storage device 225 is a hard drive, a flash drive, or a magnetoresistive memory drive.

As shown in FIG. 2, ASIC 215 also includes a configuration module 234, a decoding module 236, and a customer service module 238. In an embodiment, configuration module 234 allows a user to specify the minimum, maximum, and/or a range of bit rate for the data stream. For example, the user may specify the minimum bit rate to be at 96 kbit/s. If a data stream from a radio station is lower than 96 kbit/s then the data stream will not be not be displayed/presented to the user/host system. As mentioned, the user can also specify a preferred range of bit rate for the data stream (e.g., 32-192 kbit/s). Configuration module 234 also allows the user to change various operational settings of internet radio player 200 using user interface 220 such as, for example, In one embodiment, user interface 220 includes a LCD display, buttons, and knobs. Using interface 220, the user may at perform, at least, the following: (i) change the volume; (ii) change the station being tuned in; (iii) set the minimum, maximum, or range of bit rate; (iv) set clock; (v) set display options; (vi) set content control etc., (vii) and search and display radio stations that belong to certain genres.

In one embodiment, user interface 220 is configured to allow the user to select one or more genres for use as search criteria for available internet radio stations. This search may be performed against a locally stored database where the IP addresses and general info of a plurality of internet radio stations are stored. Alternatively, the search may be performed by support server 115. In this way, the user may limit the search and display the list of internet radio stations based on genres such as, for example, jazz or classical.

When the user changes the bit rate setting using interface 220, configuration module 234 causes communication module 232 to only select internet radio stations 120 that broadcast audio stream with the bit rate selected by the user. Additionally, prior to requesting a data stream from one of the internet radio stations, ASIC 215 may compile a list of stations from memory 210 or storage device 225 that meet the criteria set by the user. In this way, the user may select which station to tune to from one of the stations in the compiled list via user interface 220. Additionally, the user may use interface 220 to set a memory for a station, adjust the volume, and set the access control for a station.

In one embodiment, configuration module 234 forwards the bit rate preference of the user to support server 115. In this way, support server 115 may use the bit rate preference as a search criteria for compiling a list of available internet radio stations. This list may then be downloaded to internet radio player 200.

Audio stream from internet radio stations 120 may come in a variety of compression formats. Accordingly, decoding module 236 can be configured to decode various data streaming formats including, but not limited to, MIDI (Musical Instrument Digital Interface), MP3 (MPEG-1 Audio Layer 3), AAC (Advanced Audio Coding), WMA (Windows Media Audio), RA (Real Audio), and other suitable audio compression format.

In one embodiment, ASIC 215 only connects to internet radio stations 120 that broadcast audio content in a compatible audio compression format. As mentioned, information such as (i) the bit rate of the audio content, (ii) station name, (iii) current song name, (iv) station programming schedules, (v) artist, (vi) recording date, (vii) album name, (viii) label name, and (ix) data streaming format, may be obtained from support server 115. In an embodiment, these types of information are collected and organized by support server 115, which is configured to send a periodic or continuous update to internet radio player 200. Once the data stream is received and decoded, the decoded data stream is forwarded to a digital to analog (DAC) converter 222, which converts the decoded digital data stream into an analog data stream that can then be amplified and outputted to a speaker or other audio equipment. Internet radio player 200 may also extract information about the current song being played from the metadata of the data stream. Information that may be extracted from the metadata may include name of the song, name of label, artist, and length of the song, etc. The information extracted may be stored in a temporary memory buffer, memory 210, or storage device 225.

In one embodiment, customer service module 238 is configured to send an email or other form of communication to the user with information about the song currently being streamed at the user's request. This may be achieved using user interface 220. In one embodiment, user interface 220 includes a button or knob configured to cause customer service module 238 to forward all of the available information on the song that is currently being streamed to the user via email or text messaging. Prior to using this service, the user may enter her email address or telephone number using user interface 220 or using a web browser that interacts with server module 230. In this way, the user may receive all of the necessary information of a song via her phone or email. Additionally, internet radio player 200 may display some or all of the available information of a song on user interface 220.

In an embodiment, customer service module 238 forwards the user request for text information of a song to support server 115. Once the user request is received, server 115 may search for more related information on the song such as, but not limited to, where the user may purchase the song, the price of the album, the price of the song individually, etc. This information may then be relayed to internet radio player 200 to be displayed on user interface 220. Alternatively, support server 115 may send an email or text message directly to the user regarding the search result.

As illustrated in FIG. 2, ASIC 215 is capable of receiving a plurality of data streams from a plurality of internet radio stations 220 simultaneously. Each data stream will be decoded by decoding module 236 and subsequently forwarded to a dedicated DAC having a dedicated audio output.

In this way, the user may listen to different programming from different locations of his home, for example. Alternatively, the user may listen to one station and at the same time set internet radio player 200 to record the decoded digital data stream of another station to storage device 225 for later playback.

Once again it should be noted that one or more of ASIC's modules (e.g., communication module, configuration module, decoding module, and customer service module) may be parsed into separate modules by function or be combined into a single module that performs all of the functions described above. Alternatively, one or more of the modules may be independent of ASIC 215 and reside outside of ASIC 215. For example, similar to DAC 222, customer service module 238 may be separate from ASIC 215. One skilled in the art would understand that various modules may be separated or combined by their functions and design.

2.1 Web Control

As described above, internet radio player 200 aims to provide many features and benefits not found in traditional FM/AM radio receivers and traditional internet radio players such as, for example, and not limited to, freedom of movement, content control, multi-station tuning capability, and listen and record functions. In addition to these features, internet radio player 200 may also provide means for controlling its operational settings remotely from any computer connected to the internet.

Referring to FIG. 2, internet radio player 200 includes a web or HTTP (hypertext transfer protocol) server module 230 that enables internet radio player 200 to act as a web server. Module 230 is configured to respond to HTTP requests. In one embodiment, HTTP module 230 runs HTTP server software such as Apache HTTP Server (by Apache Software Foundation), IBM HTTP Server (by IBM, Inc.), Sun Java System Web Server (by Sun Microsystems), or other suitable HTTP server software applications.

The combination of server module 230 and the wireless communication capability of internet communication hardware 205 enables improved portability for the internet radio player. With this set up, the user may change any of the operational settings of internet player radio 200 using a web browser from any networked computer. Server module 230 is configured to present to the user, after proper authentication of the user, various options such as volume control, power control, station tuning control, content control, and options for setting favorite stations, etc.

Server module 230 is also configured to allow the user to set search criteria used to search for available internet radio stations. For example, using a web interface generated by server module 230, the user may program internet radio player 200 to only search for and list radio stations that belong to one or more genres such as classical, rock, hip-hop, and country. Internet radio player 200 may also upload the user's preference to support server 115. In this way, internet radio player 200 may be routinely updated with station listings and information that match with the user's preference. Additionally, the user may program internet radio player 200 to record the broadcast of a particular station using the web interface generated by server module 230. Using server module 230, the user may also enter her email address and telephone number. This enables customer service module 238 to send to the user text information about a song at the user's request.

2.2 Internet Radio Player, OEM Version

Figure 3:
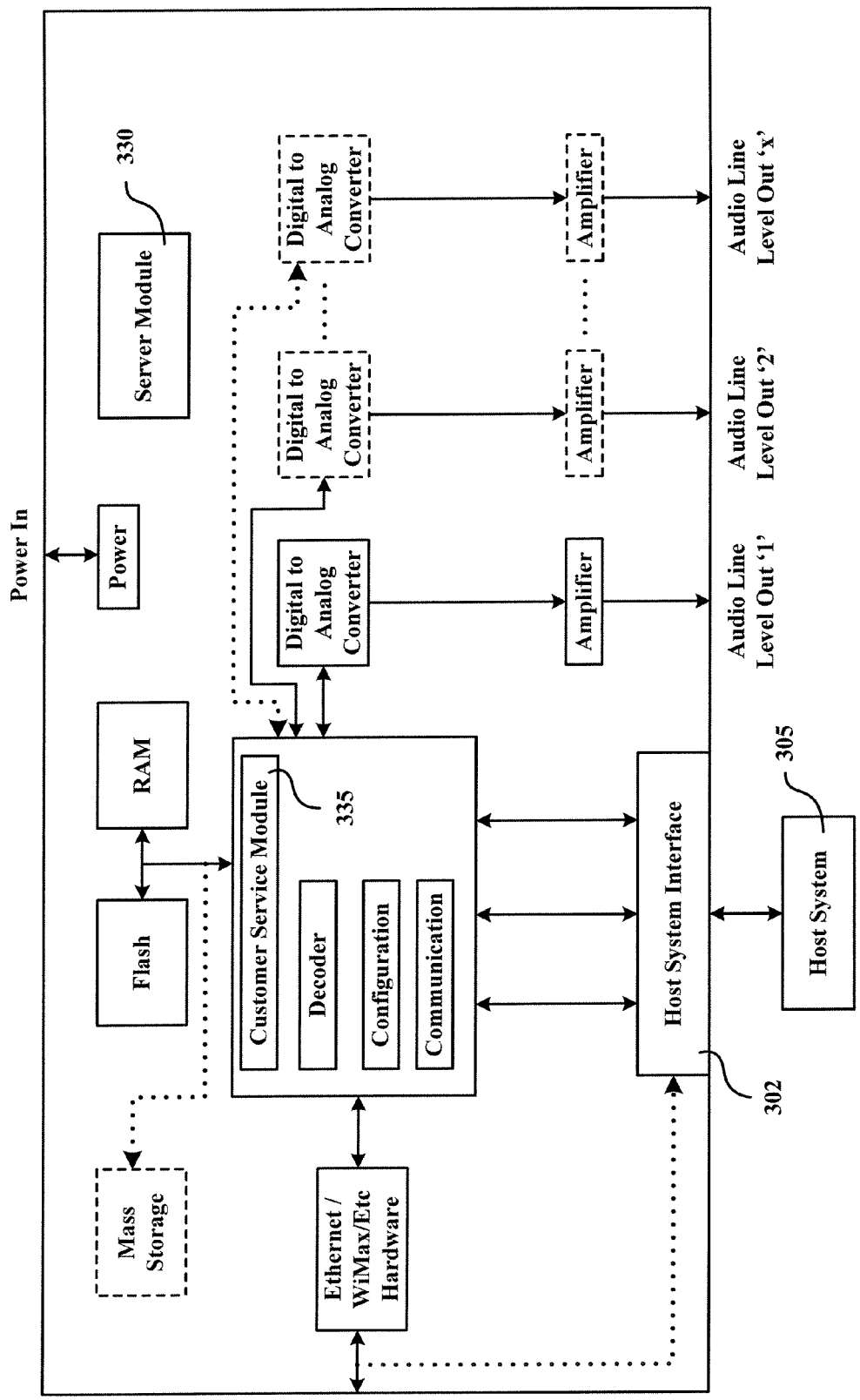
FIG. 3 illustrates a block diagram of an internet radio player for OEM according to an embodiment of the present invention.

FIG. 3 illustrates an original equipment manufacturer (OEM) internet radio player 300. OEM player 300 includes all of the features of internet radio player 200, but without a user interface. In OEM player 300, the user interface is replaced with a host system interface 302 which is configured to allow a host 305 to control the operation settings of player 300. Similar to internet radio player 200, OEM player 300 also has the capability of filtering for broadcasts having a certain minimum, maximum, or range of bit rate. In this way, the host system is allowed to control the quality content being received.

In one embodiment, OEM player 300 includes a server module 330 which has all of the features of server module 230. However, module 330 may be enabled or disabled by host system 305. In this way, the host system 305 may maintain access control of OEM player 300.

In one embodiment, OEM player 300 includes a customer service module 335. Service module 335 is similar to service module 238 and includes all of the functionalities of service module 238. However, service module 335 is configured to interact with host interface 302 instead of a user interface. For example, in response to an instruction from host interface 302, service module 335 may forward text information regarding a song to the user using email or text messaging.

As used herein, the term "network" refers to any configuration of data processing devices and software connected for information interchange. For example, the network may comprise the Internet, an intranet, a local area network (LAN), a wide area network (WAN), a virtual private network (VPN), an internetwork, a personal area network (PAN), a campus area network (CAN), a metropolitan area network (MAN), or any other configuration of data processing devices and software connected for information interchange.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A device comprising:
a memory unit configured to store a plurality of internet protocol addresses of a plurality of internet radio stations;
a communication unit configured to communicate with one of the internet radio stations using a corresponding IP address stored in the memory unit;
a first logic configured to request data from one of the plurality of internet radio stations;
a second logic configured to receive a digital data stream from the one of the plurality of internet stations and store the received digital data stream in a buffer;
a third logic configured to decode the received digital data stream;
a fourth logic configured to convert the decoded digital data stream into an analog data stream;
a service module configured to extract text information from the digital data stream and forward the extracted information to an external device; and
a web module coupled to the communication unit, the web module configured to accept HTTP requests from a remote client,
wherein the web module is configured to allow operational settings of the device to be changed via the remote client,
wherein the operational settings comprise on/off control, volume control, and station selection,
wherein the first logic is configured to request a data stream defined by a bit rate preference by a user via a user interface,
wherein a configuration module forwards the bit rate preference of the user to a support server that uses the bit rate preference as a search criteria for compiling a list of available internet radio stations that is downloaded to the device.

2. The device of claim 1, wherein the service module forwards the extracted text information in response to a user request.

3. The device of claim 1, wherein the first logic is configured to request a data stream having a specified bit rate from one of the internet radio stations, wherein the specified bit rate is selected by a user via a user interface.

4. The device of claim 3, wherein the specified bit rate comprises a minimum or maximum bit rate for the data stream.

5. The device of claim 3, wherein the specified bit rate comprises a bit rate range for the data stream.

6. The device of claim 1, wherein the extracted information comprises a name of the song and artist.

7. The device of claim 1, wherein the service module is configured to forward the extracted text information using email or text messaging.

8. The device of claim 1, wherein the first logic is configured to request a data stream having a specified genre from one of the internet radio stations, wherein the genre is defined by a user via a user interface.

9. The device of claim 1, wherein the first logic is configured to request data streams from a plurality of internet radio stations having the IP addresses stored in the memory unit.

10. The device of claim 1, wherein the communication unit is a wireless communication unit.

11. The device of claim 1, further comprising:
a client module configured to request information on available internet radio stations from a remote server, wherein the requested information includes names and IP addresses of available internet radio stations.

12. An internet radio tuner comprising:
a communication unit configured to communicate with an internet radio station;
a first logic configured to request a data stream from the internet radio station;
a second logic configured to receive a digital data stream from one of the plurality of internet stations and store the received digital data stream in a buffer;
a third logic configured to decode the received digital data stream;
a fourth logic configured to convert the decoded digital data stream into an analog data stream; and
a web module coupled to the communication unit, the web module configured to accept HTTP requests from a remote client, wherein the web module is configured to allow operational settings of the device to be changed via the remote client, wherein the operational settings comprises volume control and station selection, wherein the first logic is configured to request a data stream defined by a bit rate preference selected by a user via a user interface, wherein a configuration module forwards the bit rate preference of the user to a support server that uses the bit rate preference as a search criteria for compiling a list of available internet radio stations that is downloaded to the device.

13. The tuner of claim 12, wherein the first control logic is configured to only request data streams having a specified bit rate, wherein the specified bit rate is selected by a user via a user interface.

14. The tuner of claim 13, wherein the specified bit rate comprises a bit rate range for the data stream.

15. The tuner of claim 12, futher comprising a fifth logic configured to store the received data stream in a memory unit.

16. The tuner of claim 12, wherein the first logic is configured to request data streams from one of a plurality of internet radio stations having the IP addresses stored in a memory unit.

17. The tuner of claim 12, wherein the communication unit is a wireless communication unit.

18. The tuner of claim 17, wherein the wireless communication unit is an 802.11 or WiMax interface.

19. The tuner of claim 12, further comprising:

a service module configured to extract text information regarding a song from the digital data stream and forward the extracted information to an external device in response to a user request.

20. The tuner of claim 19, wherein in the service module forwards the user request to a remote server, whereby the remote server searches for more information regarding the song.

\* \* \* \* \*